Patented July 3, 1923.

1,460,790

UNITED STATES PATENT OFFICE.

JAMES H. CRITCHETT, OF NIAGARA FALLS, NEW YORK, ASSIGNOR TO UNION CARBIDE & CARBON RESEARCH LABORATORIES, INC., A CORPORATION OF NEW YORK.

WELDING ROD.

No Drawing.    Application filed June 24, 1921. Serial No. 480,231.

*To all whom it may concern:*

Be it known that I, JAMES H. CRITCHETT, a citizen of the United States, residing at Niagara Falls, in the county of Niagara and State of New York, have invented certain new and useful Improvements in Welding Rods, of which the following is a specification.

This invention relates to welding and similar operations wherein metal in fluid form is caused to adhere to solid metal and relates especially to the metal which is added in such operations. More particularly, the invention pertains to chrome-steels adapted to be used in welding, filling, sheathing and like operations when it is desired that the added metal shall be a material of great hardness.

A high degree of hardness in the added metal has heretofore been obtained by the use of a high-carbon steel as the welding metal. However, the use of high-carbon steels is attended with difficulties, as increasing carbon content permits overheating to take place at lower temperatures and promotes the formation of blowholes and other non-uniformities in the weld or the like. It is therefore desirable to obtain hardness in the added metal with an ingredient the use of which is not attended with these unfavorable results.

I have found that the carbon content of the added metal may be reduced to such an extent that it occasions no difficulty, and great hardness may nevertheless be obtained, if chromium is contained in the welding metal in suitable quantity. In addition to hardness, the chromium imparts to the weld a degree of strength and toughness which cannot be obtained with carbon steels of any carbon content, and even when the carbon is high the character of the weld may be improved by addition of chromium. While the use of high-carbon chromium steel is within my invention, my preferred material is a low or medium carbon steel with an addition of chromium, containing, for example, carbon 0.5% and chromium 1.1%. The chromium may, if desired, be increased to 3.0% while the carbon content may be as much as 1.0%. As stated above, however, it is preferred to keep the carbon at a moderate figure and to secure the necessary hardness and toughness by suitable additions of chromium within the limits given. Furthermore, I have found that a reciprocal relation between the carbon and chromium percentages gives the best results, this relation being sufficiently illustrated by the following examples: If the maximum chromium addition (3.0%) is used, the carbon should preferably not exceed 0.50%; while if the carbon is as low as 0.20%, the chromium content should be between 1.5% and 3.0%. With a carbon content approaching the maximum (for example 1.0%), the chromium should preferably not exceed 1.5%.

It will be noted that in the specific examples given above, the sum of the chromium and carbon percentages ranges between 1.6% and 3.5%.

Alloys prepared in accordance with my invention may be formed into rods or pencils and used as electrodes or with the blowpipe. Methods of forming and using rods of this character, and of adjusting their size in accordance with the purpose for which they are to be used, are well understood in the art and no modification of these methods is necessitated by the novel compositions herein described.

I claim:

1. A welding rod or the like consisting of an iron alloy containing carbon and a substantial amount of chromium.

2. A welding rod or the like consisting of an iron alloy containing chromium in substantial amount less than 3% and carbon.

3. A welding rod or the like consisting of an iron alloy containing chromium in substantial amount and carbon, the sum of the percentages of chromium and carbon being between about 1.6% and about 3.5%.

4. A welding rod or the like consisting of an iron alloy containing a substantial amount of chromium and less than 0.75% carbon.

5. A welding rod or the like consisting of an iron alloy containing less than 0.75% carbon and chromium in substantial amount less than 3%.

6. A welding rod or the like composed of an iron alloy containing less than 0.75% of carbon, and chromium, the sum of the percentages of chromium and carbon being between about 1.6% and about 3.5%.

7. A welding rod or the like consisting of an iron alloy containing about 0.5% carbon and about 1.1% chromium.

In testimony whereof, I affix my signature.

JAMES H. CRITCHETT.